United States Patent

[11] 3,595,585

[72] Inventor  Barney C. Bristow
              233 Virginia Ave., San Mateo, Calif. 94400
[21] Appl. No. 8,972
[22] Filed     Feb. 5, 1970
[45] Patented  July 27, 1971

[54] ROTARY SEAL ASSEMBLY
     10 Claims, 4 Drawing Figs.
[52] U.S. Cl. .................................................. 277/58
[51] Int. Cl. ............................................... F16j 15/54
[50] Field of Search ...................................... 277/58, 32,
              9, 117, 120, 123, 125, 143, 144, 189.5

[56]           References Cited
          UNITED STATES PATENTS
3,156,475  11/1964  Gerard et al. .................  277/58
3,179,423   4/1965  McCloud ......................  277/58 X
3,413,008  11/1968  Greiner .......................  277/58

Primary Examiner—Robert I. Smith
Attorney—Flehr, Hohbach, Test, Albritton & Herbert ABSTRACT: Rotary seal assembly for forming a dynamic seal between a rotating shaft and a stationary housing. The assembly includes an insert member which carries an O-ring and is adapted to be mounted in the housing in a plurality of discrete positions. In each of these positions, the O-ring engages a different portion of the shaft, thereby reducing the wear on the shaft and extending the life of the seal. A plurality of interchangeable insert members can be used to spread the wear over additional portions of the shaft.

PATENTED JUL 27 1971 3,595,585
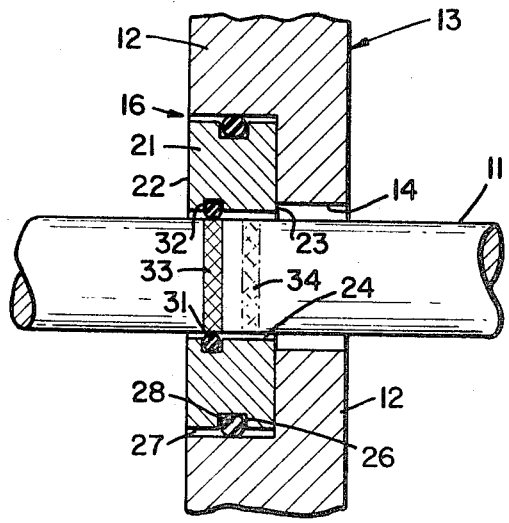
FIG_1A
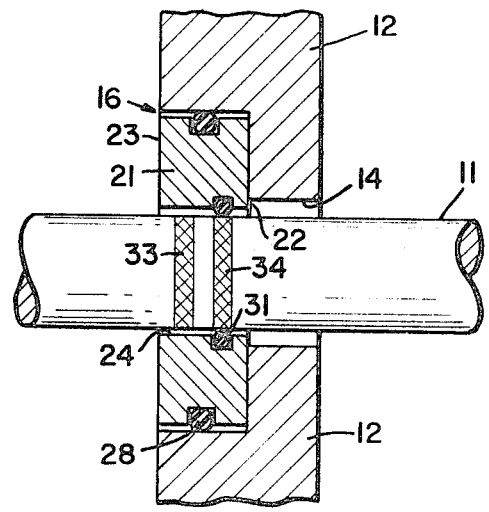
FIG_1B
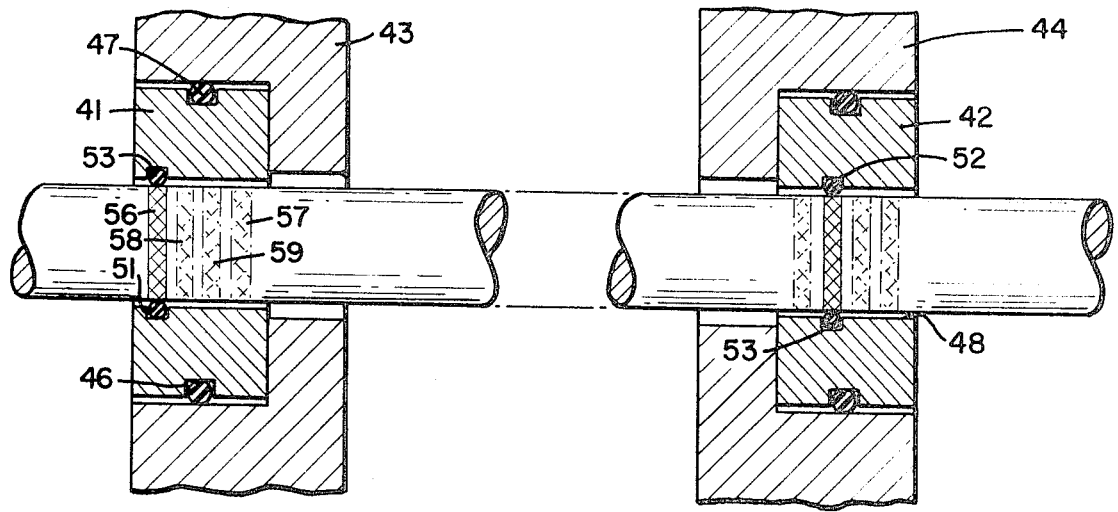
FIG_2
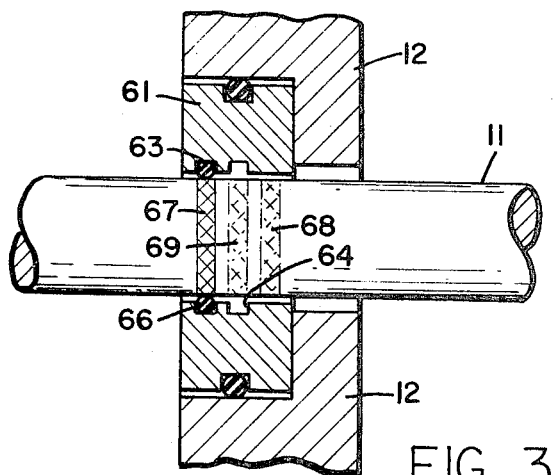
FIG_3
INVENTOR.
BARNEY C. BRISTOW
BY Fehr, Hohbach, Test,
Albritton & Herbert
ATTORNEYS

ROTARY SEAL ASSEMBLY

BACKGROUND OF THE INVENTION

This invention pertains generally to dynamic seals and more particularly to a rotary seal assembly for providing a seal between a rotating shaft and a stationary housing or other fixed member through which the shaft extends.

Many types of seals have heretofore been provided for forming a dynamic seal around a rotating shaft. These known seals include cup seals, lip seals, packing glands, and O-ring seals. These seals generally include a sealing member adapted for rotatably engaging the rotating shaft to prevent the flow of fluids, such as lubricating oil, axially of the shaft. A problem exists with these seals because of the rubbing action which occurs between a sealing member and the surface of the shaft. This rubbing action causes wear of both the sealing member and the shaft, reducing the effectiveness of the seal and the life of the shaft. This problem is particularly severe where the fluids to which the shaft is exposed contains abrasive particles such as are encountered with hydraulic tank-cleaning apparatus of the type described in my U.S. Pat. No. 3,464,632, issued Sept. 2, 1969.

With O-ring seals, the O-ring is commonly mounted in a groove formed in the housing which must be machined to close tolerances to provide an effective seal. In many instances, a problem exists because the physical shape of the housing makes proper machining of the groove very difficult.

There is, therefore, a need for a new and improved rotary seal assembly which overcomes the foregoing and other problems encountered with dynamic seals heretofore provided.

SUMMARY AND OBJECTS OF THE INVENTION

The rotary seal assembly of the present invention includes an insert member adapted to be removably mounted in the housing in a plurality of discrete positions. This member is formed to include a through bore adapted for passing the shaft, and means is provided for forming a static seal between the insert member and the housing. Dynamic seal means is carried by the insert member and adapted for rotatably engaging a different portion of the shaft in each of the discrete positions. A second insert member can be combined with the first insert member to provide additional areas of contact on the shaft.

It is in general an object of the present invention to provide a new and improved rotary seal assembly for forming a dynamic seal around a rotating shaft.

Another object of the invention is to provide a rotary seal assembly of the above character which permits wear to be selectively distributed over more than one area of the shaft, thereby increasing the life of the shaft.

Another object of the invention is to provide a rotary seal assembly of the above character which is compact in size and economical to manufacture.

Additional objects and features of the invention will be apparent from the following description in which the preferred embodiments are set forth in detail in conjunction with the accompanying drawing.

BRIEF DESCRIPTION OF THE DRAWING

FIG. 1A is a sectional view of one embodiment of a rotary seal assembly incorporating the present invention and having a single insert member.

FIG. 1B is another sectional view of the embodiment shown in FIG. 1A, with the insert member axially reversed in position.

FIG. 2 is a sectional view of an embodiment of a rotary seal assembly incorporating the present invention and having a pair of insert members.

FIG. 3 is a sectional view of another embodiment of a rotary seal assembly incorporating the present invention and having a single insert member.

DESCRIPTION OF THE PREFERRED EMBODIMENT

As illustrated in FIGS. 1A and 1B, the rotary seal assembly is used to provide a dynamic seal between a rotating shaft 11 and a wall member 12 of a stationary housing or casing 13. The wall member includes a circular opening 14 through which the shaft extends. The wall member 12 is counterbored, as indicated at 16, to provide a seat for the seal assembly.

The seal assembly includes a generally cylindrical insert member 21 having first and second substantially flat end walls 22, 23. This member is formed to include an axially extending through bore 24 having a diameter greater than the diameter of the shaft 11. The insert member 21 is removably mounted in the counterbore 16, with the shaft 11 passing through the bore 24. It is to be noted that the insert member can be mounted either in the position shown in FIG. 1A with the first end wall 22 facing outward, or can be axially reversed, as illustrated in FIG. 1B, with the second end wall 23 facing outward.

Means is provided for forming a static seal between the insert member 21 and the housing wall member 12. This means includes an annular groove 26 formed in the insert member and opening through the outer wall 27 thereof. An O-ring 28 is disposed in the annular groove 26.

Dynamic seal means is carried by the insert member 21 and adapted for rotatably engaging the shaft 11. This means includes an O-ring 31 disposed in an annular groove 32 formed in the insert member 21 and opening through the wall of the axial bore 24. The annular groove 32 is located closer to the end wall 22 than to the end wall 23. Thus, the O-ring 31 engages a different portion of the shaft 11 in each of the positions illustrated in FIGS. 1A and 1B. In the position illustrated in FIG. 1A, that is with the end wall 22 facing outwardly, the portion of the shaft engaged by the O-ring 31 is designated by the shaded area 33. The portion engaged in the position illustrated in FIG. 1B is designated by the shaded area 34.

Operation and use of the embodiment of the rotary seal assembly shown in FIGS. 1A and 1B can now be described briefly. Let it be assumed that the insert member 21 has been inserted in the counterbore 16 in the position illustrated in FIG. 1A. As the shaft 11 rotates, the insert member remains in a stationary position relative to the housing wall member 12. This is because the O-ring 28, being of greater diameter than the O-ring 31, produces a greater frictional force between the insert member 21 and the wall member 12 than the O-ring 31 produces between the insert member 21 and the shaft 11. The O-ring 31 likewise remains stationary relative to the insert and wall members. The path of least resistance exists between the O-ring 31 and the shaft 11, and the shaft therefore rotates within the O-ring 31. This O-ring engages the shaft in the region indicated by the shaded area 33, preventing fluids from flowing across this portion of the shaft. After a predetermined amount of operating time, the insert member 21 can be removed from the counter bore 16, reversed, and reinserted in the position illustrated in FIG. 1B. In this position, the O-ring 31 engages the portion of the shaft designated by the shaded area 34. Since the O-ring engages a different portion of the shaft in each of the two positions, the life of the shaft will be double that of a shaft with a conventional seal in which all of the wear is concentrated in a single area.

The embodiment illustrated in FIG. 2 includes a pair of insert members 41, 42. These insert members are removably mounted in counterbores formed in stationary wall members 43, 44. The insert members 41, 42 can be reversed axially in a manner similar to that in which the insert member 21 is reversed. In addition, the members 41, 42 are interchangeable. Thus, the insert member 41 which is shown mounted in the wall member 43 can also be mounted in the wall member 44.

The insert members 41, 42 are formed to include annular grooves 46 in which O-rings 47 are disposed. These O-rings provide static seals between the insert members and wall members in the manner described hereinbefore. Each of the insert members also has an axially extending bore 48 through which the shaft 11 extends.

The insert members 41, 42 are provided with dynamic seals adapted for engaging a plurality of discrete portions of the shaft 11. This means includes annular grooves 51, 52 formed in the insert members 41, 42, respectively, and opening through the wall of the bore 48. It will be noted that the groove 51 is located closer to the end wall of the insert member than is the groove 52. O-rings 53, 54 are disposed in these grooves. These O-rings engage different portions of the shaft 11 in each of the positions of the insert members. With the embodiment shown in FIG. 2, the wear can be distributed over four areas of the shaft at each seal location. Thus, with the insert members installed in the positions shown in FIG. 2, the O-ring 53 engages the shaft in the area 56. If the insert member 41 is reversed axially, the O-ring 53 will engage the shaft in the area 57. If the insert members are interchanged, the O-ring 53 will engage the shaft in the area 58. Then if the insert member 42 is reversed in the wall member 43, the O-ring 53 will engage the shaft in the area 59.

It should be noted that while the rotary seal assembly illustrated in FIG. 2 distributes the wear on the shaft over four discrete areas, it requires no more space than conventional seals such as cup seals, packing glands, and lip seals. For example, insert members providing four areas of wear for a ½-inch shaft have been constructed according to the present invention having an outside diameter on the order of 1 inch and a width on the order of seven-sixteenth inch.

The embodiment illustrated in FIG. 3 includes a single insert member 61 which is generally similar in character to the insert members described hereinbefore. It is formed to include an axial bore 62, with first and second annular grooves 63, 64 opening through the wall thereof. An O-ring 66 is adapted to be mounted alternatively in these grooves. When the O-ring is mounted in the groove 63, as illustrated in FIG. 3, it contacts the shaft 11 in the region designated by the shaded areas 67. If the insert member is axially reversed, with the O-ring remaining in the groove 63, it will engage the shaft in the area 68. If the O-ring is disposed in the groove 64, it will contact the shaft in the area 69.

The embodiment shown in FIG. 3 distributes the wear over three portions of the shaft. By locating the groove 64 off the central plane of the insert member, a fourth area of contact can be provided. By using a plurality of interchangeable insert members 61, each having O-ring grooves at different axial locations, additional areas of contact can be provided.

It is apparent from the foregoing that a new and improved rotary seal assembly has been provided. While only the presently preferred embodiments have been described herein, as will be apparent to those familiar with the art, certain changes and modifications can be made without departing from the scope of the invention as defined by the following claims.

I claim:

1. In a rotary seal assembly for providing a dynamic seal between a rotating shaft and a stationary housing, an insert member adapted to be removably mounted in the housing in a plurality of discrete positions, said insert member being formed to include a through bore adapted for passing said shaft, means for forming a static seal between said insert member and said housing, and dynamic seal means carried by said insert member and adapted for rotatably engaging a different portion of said shaft in each of said discrete positions.

2. A rotary seal assembly as in claim 1 wherein said insert member is a generally cylindrical member, with said through bore extending axially thereof.

3. A rotary seal assembly as in claim 2 wherein said means for forming a static seal comprises an annular groove opening through the outer wall of the cylindrical insert member and an O-ring disposed in said annular groove.

4. A rotary seal assembly as in claim 1 wherein said insert member is adapted to be mounted in said housing in a pair of axially reversed positions.

5. A rotary seal assembly as in claim 1 wherein said dynamic seal means includes an annular groove opening through the wall defining the through bore in said insert member and an O-ring disposed in said annular groove.

6. A rotary seal assembly as in claim 5 wherein said insert member is formed to include a second annular groove opening through the wall of said bore, said second annular groove being adapted for alternately receiving said O-ring.

7. A rotary seal assembly as in claim 5 together with a second insert member having a through bore and an annular groove opening through the wall thereof, and an O-ring disposed in said annular groove, said second insert member being adapted to be removably mounted in said housing in a plurality of discrete positions.

8. A rotary seal assembly as in claim 7 wherein the first-named and second insert members are adapted to be mounted in interchangeable positions and wherein the annular grooves are formed at different axial locations in each of said members whereby the O-rings in said annular grooves are adapted for engaging different portions of said shaft in each of said positions.

9. In a rotary seal assembly for providing a dynamic seal between a rotating shaft and a stationary housing, a generally cylindrical insert member adapted to be removably mounted in a plurality of discrete positions in the housing, at least two of said positions being axial reversals of each other, said insert member being formed to include an axially extending bore adapted for passing said shaft, an O-ring disposed in a groove formed in the outer surface of said insert member for forming a static seal between said insert member and said housing, and an annular groove formed in the wall of said axially extending bore and carrying an O-ring sealing member, said O-ring sealing member being adapted for rotatably engaging a different portion of said shaft in each of said discrete positions.

10. A rotary seal assembly as in claim 9 together with a second insert member of similar character, but having its annular groove formed at a different axial location than the annular groove in the first-named insert member, said insert members being adapted for mounting in interchangeable positions with the O-ring sealing members engaging different portions of said shaft in each of said positions.